(12) United States Patent
Someya

(10) Patent No.: US 7,796,284 B2
(45) Date of Patent: Sep. 14, 2010

(54) IMAGE PROCESSING SYSTEM, IMAGE PROCESSING APPARATUS, AND CONTROL METHOD AND PROGRAM THEREFOR

(75) Inventor: Shuji Someya, Adachi-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 982 days.

(21) Appl. No.: 11/221,509

(22) Filed: Sep. 8, 2005

(65) Prior Publication Data

US 2006/0050309 A1     Mar. 9, 2006

(30) Foreign Application Priority Data

Sep. 9, 2004   (JP)   ............................. 2004-262955
May 27, 2005   (JP)   ............................. 2005-156196

(51) Int. Cl.
  *G06F 3/12*   (2006.01)
(52) U.S. Cl. ...................... 358/1.15; 358/405; 358/434
(58) Field of Classification Search ................ 358/1.15, 358/405, 434; 370/401; 706/17; 709/246
See application file for complete search history.

(56) References Cited

U.S. PATENT DOCUMENTS

| 6,377,357 | B1 * | 4/2002 | Sato et al. ................... 358/1.15 |
| 6,600,750 | B1 * | 7/2003 | Joffe et al. ................... 370/401 |
| 2002/0035554 | A1 * | 3/2002 | Katsuno et al. ............... 706/17 |
| 2002/0080414 | A1 * | 6/2002 | Tanimoto .................... 358/402 |
| 2003/0053091 | A1 | 3/2003 | Tanaka |
| 2003/0097474 | A1 * | 5/2003 | Defosse et al. ............. 709/246 |
| 2005/0005032 | A1 * | 1/2005 | Naruse ......................... 710/1 |
| 2005/0021647 | A1 * | 1/2005 | Maeda ....................... 709/206 |

FOREIGN PATENT DOCUMENTS

| JP | 08-115280 | 5/1996 |
| JP | 2002-135499 | 5/2002 |

* cited by examiner

*Primary Examiner*—Twyler L Haskins
*Assistant Examiner*—Michael Burleson
(74) *Attorney, Agent, or Firm*—Canon USA Inc IP Div

(57) ABSTRACT

The present invention provides an image processing apparatus and an image processing method for reducing burden of managing documents on a user, the burden being caused when image data is retransmitted and when both a previously transmitted document and the retransmitted document are stored. To accomplish this, a user selects a transmitted document from a transmission history stored in an image processing apparatus and requests a processing status of the selected document to an image processing apparatus on a receiver side. The image processing apparatus on the receiver side determines the processing status, puts output restrictions on the selected document, and transmits the determination result. The image processing apparatus on the transmitter side receives the response and transmits replacing image data. The image processing apparatus on the receiver side replaces the previously received document with the replacing image data and cancels the output restrictions.

23 Claims, 14 Drawing Sheets

FIG. 15

| Attribute List | |
|---|---|
| Attribute (1501) | Value (1502) |
| Name of file | bb34 |
| Destination MFP | MFP-B |
| Date/Time of transmission | 04/06/07-14:15 |
| Size | 2733KB |
| Page layout | 2 pages/sheet |
| Printing mode | Double-sided |
| ⋮ | ⋮ |
| Scaling | 100% |
| Color mode | Color |

# IMAGE PROCESSING SYSTEM, IMAGE PROCESSING APPARATUS, AND CONTROL METHOD AND PROGRAM THEREFOR

BACKGROUND OF THE INVENTION

1. Field of the Invention

The present invention relates to an image processing system, an image processing apparatus, and a control method and program therefor.

2. Description of the Related Art

Hitherto, in an image processing apparatus, such as a multi-function peripheral apparatus for transmitting image data created by scanning a document image through a network and storing it in another apparatus, the received data is stored while being attached with a unique identifier.

However, if a transmitter finds a mistake in a document after transmitting the document and if the transmitter retransmits the document, both the document transmitted first and the retransmitted corrected document are stored in an apparatus on a receiver side. Therefore, the receiver cannot easily determine which of these similar documents is the correct document. Further, if an already transmitted file is retransmitted by compressing it or by changing its file format because a size of the transmitted file is too large, the unnecessary file transmitted first remains in the apparatus.

In order to solve this problem, Japanese Patent Laid-Open No. 2002-135499 suggests the following technique. That is, in a process of transmitting image data to a destination apparatus, it is determined whether already transmitted image data is stored in the same destination apparatus. If the destination apparatus has the transmitted image data, a process required by the destination apparatus is executed.

In the system described in the above-mentioned patent document, however, image data is identified based on its attribute information. Therefore, image data having different attribute information is regarded as different image data, which cannot be replaced.

SUMMARY OF THE INVENTION

Accordingly, the present invention provides an apparatus and method for saving resources on a receiver side and reducing burden of data management on a user by effectively retransmitting image data.

According to an aspect of the present invention, an image processing apparatus includes: a history storing unit adapted to store a transmission history of image data; an input unit adapted to specify transmitted image data in the transmission history stored in the history storing unit and input instructions of retransmitting the specified image data; a determination requesting unit adapted to request determination of whether the transmitted image data specified by the input unit has been output from an image processing apparatus on a receiver side; a determining unit adapted to determine whether the specified received image data has been output in response to the determination request from an image processing apparatus on a transmitter side; a responding unit adapted to transmit a determination result generated in the determining unit to the image processing apparatus on the transmitter side; a retransmitting unit adapted to retransmit the transmitted image data if it is determined that the transmitted image data specified by the input unit has not been output from the image processing apparatus on the receiver side; and a replacing unit adapted to replace the previously received image data with the retransmitted image data after receiving the retransmitted image data.

According to another aspect of the present invention, an image processing apparatus includes: a history storing unit adapted to store a reception history of image data; a destination specifying unit adapted to specify an image processing apparatus on a receiver side; a history requesting unit adapted to request the reception history to the image processing apparatus on the receiver side specified by the destination specifying unit; a history transmitting unit adapted to transmit the reception history stored in the history storing unit in response to the request from the image processing apparatus on the transmitter side; an input unit adapted to specify received image data in the reception history transmitted from the image processing apparatus on the receiver side and input instructions of retransmitting the specified image data; a determination requesting unit adapted to request determination of whether the image data specified by the input unit has been output from the image processing apparatus on the receiver side; a responding unit adapted to respond to the image processing apparatus on the transmitter side after determining whether the previously received image data has been output in response to the request from the image processing apparatus on the transmitter side; a retransmitting unit adapted to retransmit the image data if it is determined that the image data specified by the input unit has not been output from the image processing apparatus on the receiver side, and a replacing unit adapted to replace the previously received image data with the retransmitted image data after receiving the retransmitted image data.

Further features of the present invention will become apparent from the following description of exemplary embodiments (with reference to the attached drawings).

BRIEF DESCRIPTION OF THE DRAWINGS

FIG. 15 shows an example of a table for managing document attribute information in the image processing apparatus according to the second embodiment.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<Configuration of System>

Figure 1:
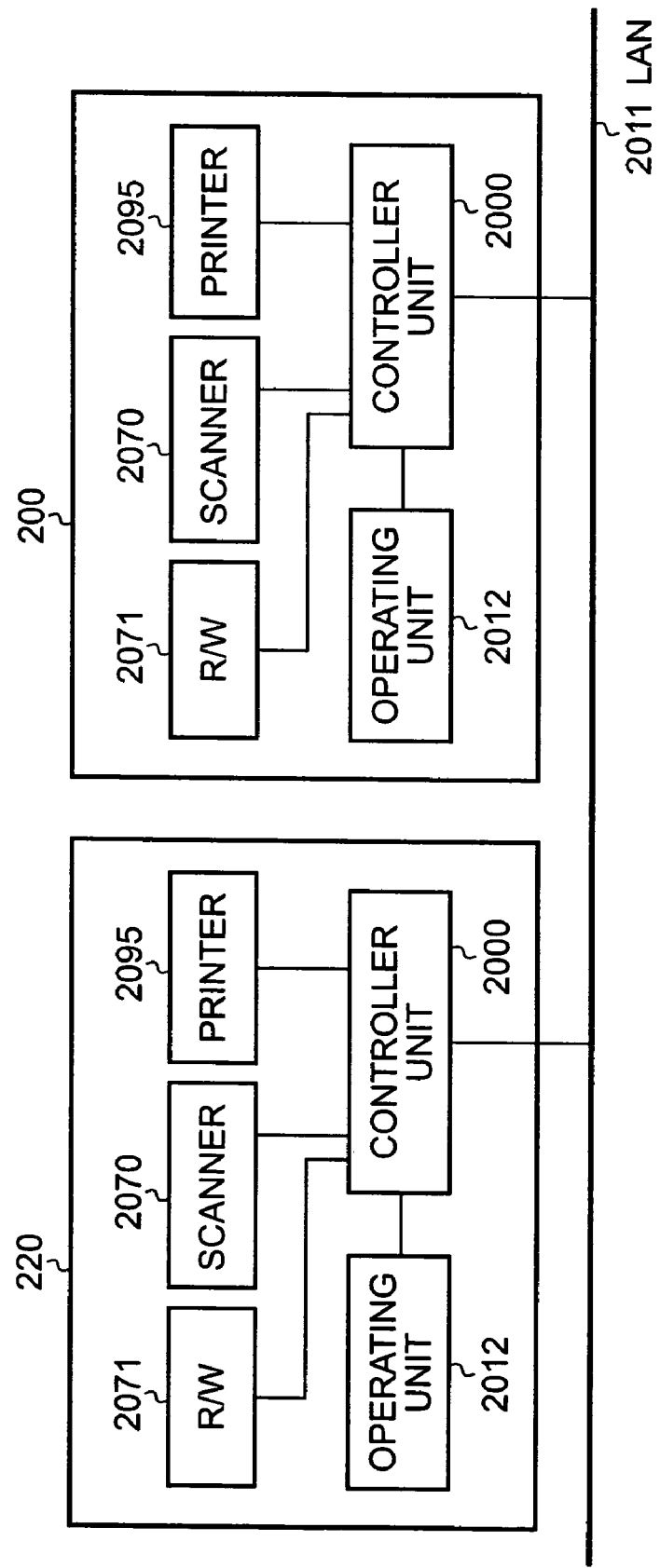
FIG. 1 is a block diagram showing an entire configuration of an image processing system according to a first embodiment of the present invention.

FIG. 1 is a block diagram showing a configuration of an image processing system according to a first embodiment. In FIG. 1, a multi-function peripheral apparatus (MFP) 200 serves as an image processing apparatus and includes a scanner 2070 serving as an image input device; a printer 2095 serving as an image output device; a controller unit 2000; an operating unit 2012 serving as a user interface; and a reader/writer 2071 for reading/writing data from/to an external storage medium. The scanner 2070, the printer 2095, and the operating unit 2012 connect to the controller unit 2000 and are controlled by commands from the controller unit 2000. The controller unit 2000 connects to a network transmission medium such as a local area network (LAN) 2011.

In this image processing system, another MFP 220 having the same configuration as that of the MFP 200 connects to the LAN 2011.

<Configuration of MFP>

Figure 2:
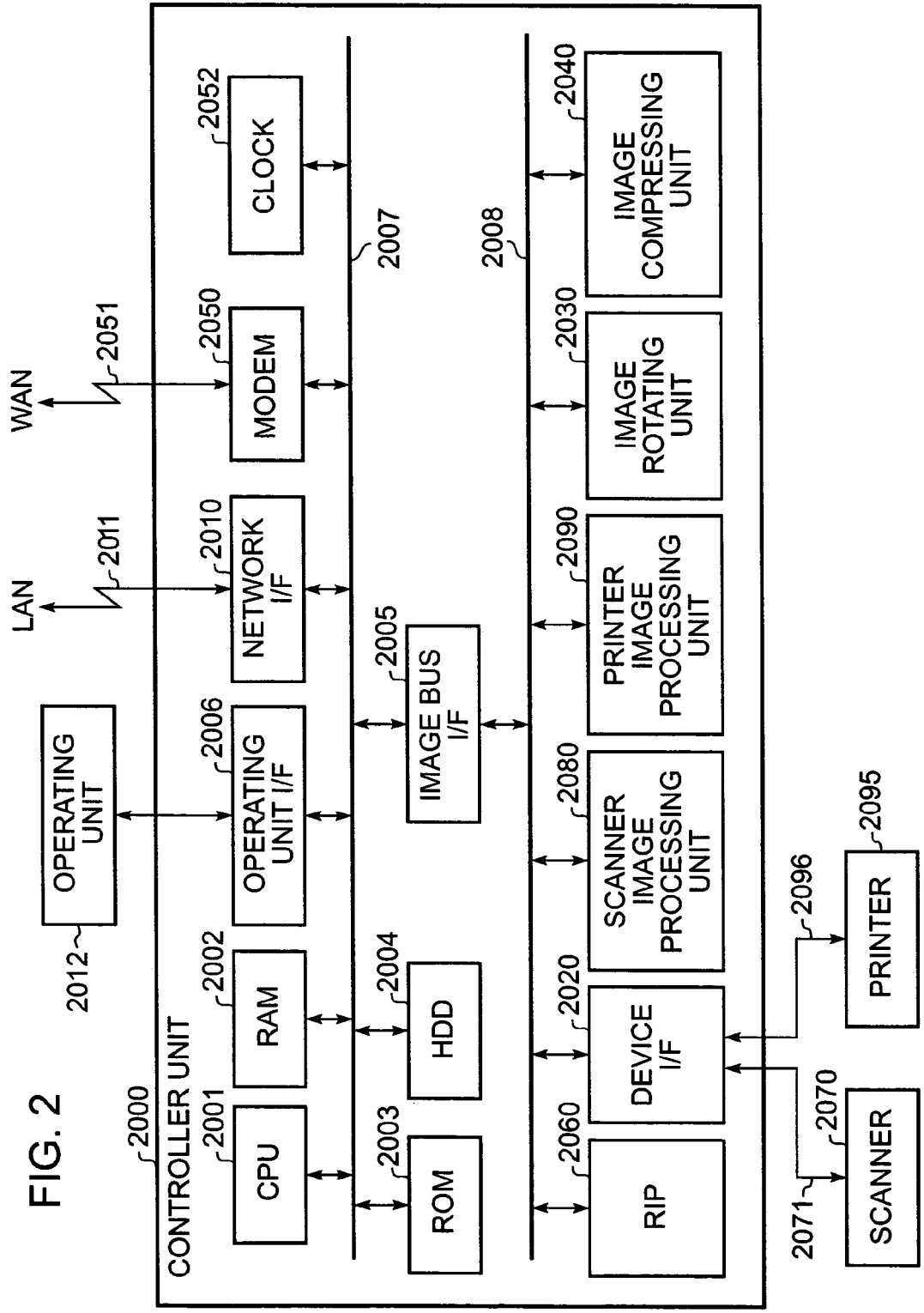
FIG. 2 is a block diagram showing a specific configuration of a controller unit.

FIG. 2 is a block diagram showing a specific configuration of the controller unit 2000 of the MFP 200. As shown in FIG. 2, the controller unit 2000 connects to the scanner 2070 serving as an image input device and the printer 2095 serving as an image output device. On the other hand, the controller unit 2000 connects to the LAN 2011 and a public network (WAN) 2051 and functions as a controller for inputting/outputting image information and device information.

In the controller unit 2000, a central processing unit (CPU) 2001 controls the entire system including an internal clock 2052. A random access memory (RAM) 2002 is a system work memory used for operating the CPU 2001. The RAM 2002 also serves as an image memory for temporarily storing image data. A read only memory (ROM) 2003 is a boot ROM and stores a boot program for the system. A hard disk drive (HDD) 2004 stores system software, image data, an image processing algorithm required for guarantee/authentication of an original, and control information of the reader/writer.

An operating unit interface (I/F) 2006 serves as an interface for the operating unit (UI) 2012 and outputs image data to be displayed in the operating unit 2012 to the operating unit 2012. Also, the operating unit I/F 2006 transmits information input by a user through the operating unit 2012 to the CPU 2001.

A network interface (I/F) 2010 controls a connection with the LAN 2011 and inputs/outputs information through the LAN 2011. A modem 2050 controls a connection with a public network (i.e., WAN 2051) and inputs/outputs information through the public network. The above-described devices are provided on a system bus 2007.

An image bus interface (I/F) 2005 is a bus bridge for connecting the system bus 2007 to an image bus 2008 which transfers image data at high speed and converting a data configuration. The image bus 2008 includes a PCI (peripheral component interconnect) bus or an IEEE (Institute of Electrical and Electronics Engineers) 1394.

The following devices are provided on the image bus 2008. A raster image processor (RIP) 2060 expands PDL code transmitted through the network to a bitmap image. A device interface (I/F) 2020 connects the image input/output devices, such as the scanner 2070 and the printer 2095, to the controller unit 2000, and executes synchronous/asynchronous conversion of image data.

A scanner image processing unit 2080 executes processes on input image data, for example, calculation of a feature amount, recognition, correction, process, and edit. A printer image processing unit 2090 executes processes on output image data to be printed, for example, correction of a printer, conversion of resolution, and addition of electronic information. An image rotating unit 2030 rotates image data, and an image compressing unit 2040 executes compression/decompression according to JPEG (Joint Photographic Experts Group) or the like on multilevel image data and compression according to JBIG (Joint Bi-level Image Experts Group), MMR (Modified Modified Read), MR (Modified Read), or MH (Modified Huffman) on binary image data. The clock 2052 manages time display and standard time of a weekly timer function.

Figure 3:
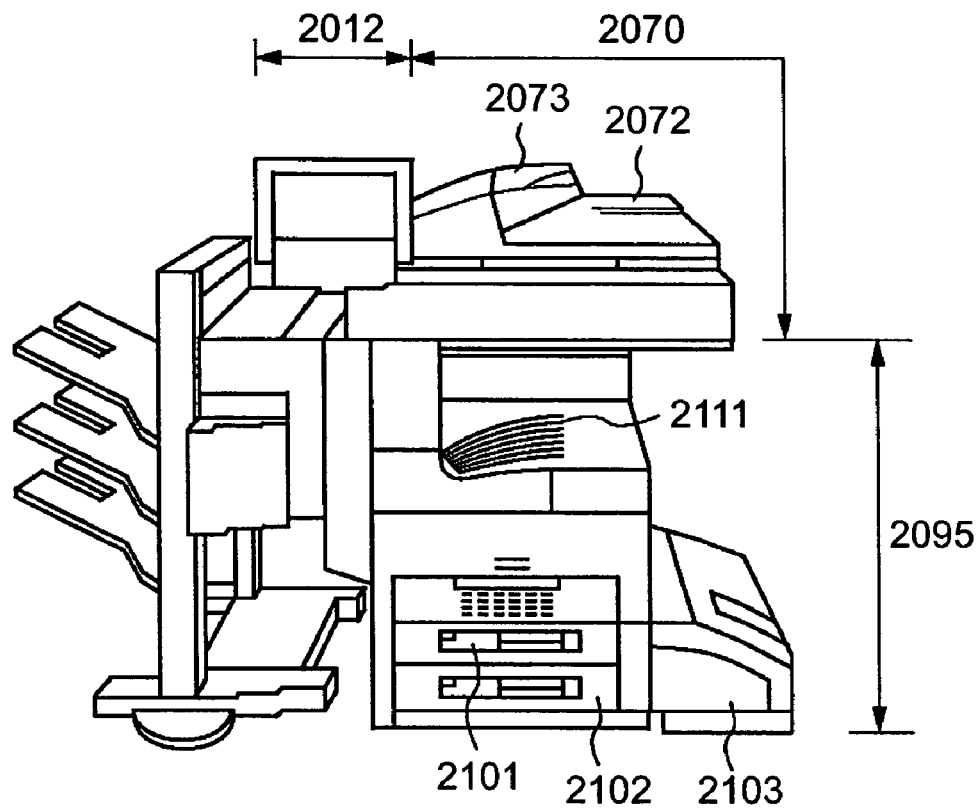
FIG. 3 shows an appearance of an image processing apparatus according to the first embodiment.

FIG. 3 shows an appearance of the MFP 200 according to this embodiment. In FIG. 3, the scanner 2070 serving as an image input device optically reads an image on a document by scanning it with a CCD line sensor (not shown), and generates and outputs raster image data. When a user sets a document on a tray 2073 of an auto sheet feeder (ASF) 2072 and inputs instructions of starting reading through the operating unit 2012, the ASF 2072 feeds sheets of the document one by one, so that the scanner 2070 reads images on the document.

On the other hand, the printer 2095 functions to print the raster image data on paper. Any printing method may be used in this printer, for example: an electrophotographic method using a photoconductive drum or a photosensitive belt; or an inkjet method in which ink is ejected from a minute nozzle array to directly print an image on paper. A printing operation is started in response to instructions from the controller CPU 2001.

The printer 2095 has a plurality of paper feeders and paper cassettes 2101, 2102, and 2103 corresponding thereto so that a user can select a size and direction of paper from among various sizes and directions. An output tray 2111 receives printed sheets of paper.

Figure 4:
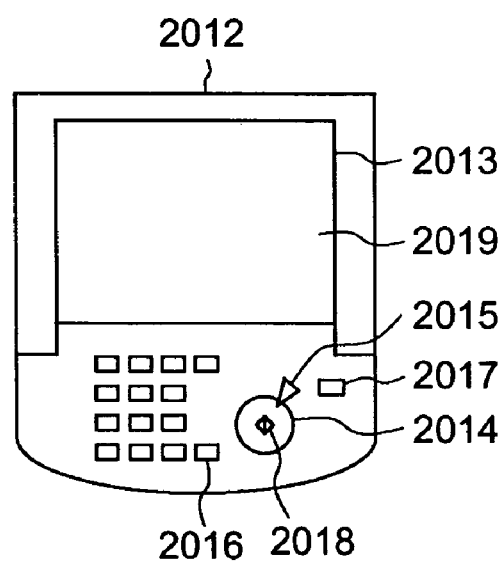
FIG. 4 shows an appearance of the operating unit shown in FIG. 3.

FIG. 4 shows a configuration of the operating unit 2012 shown in FIG. 3. As shown in FIG. 4, a touch panel sheet 2019 is attached on an LCD display unit 2013, and a system operation screen and soft keys are displayed on the touch panel sheet 2019. When a displayed key is touched, position information indicating the touched position is transmitted to the controller CPU 2001.

A start key 2014 is used to start reading of a document image. A green/red LED display unit 2018 is positioned at the center of the start key 2014, the color thereof indicating whether the start key 2014 can be used. A stop key 2015 stops an operation. An ID key 2016 is used to input a user ID and a reset key 2017 is used to initialize settings from the operating unit.

Figure 5:
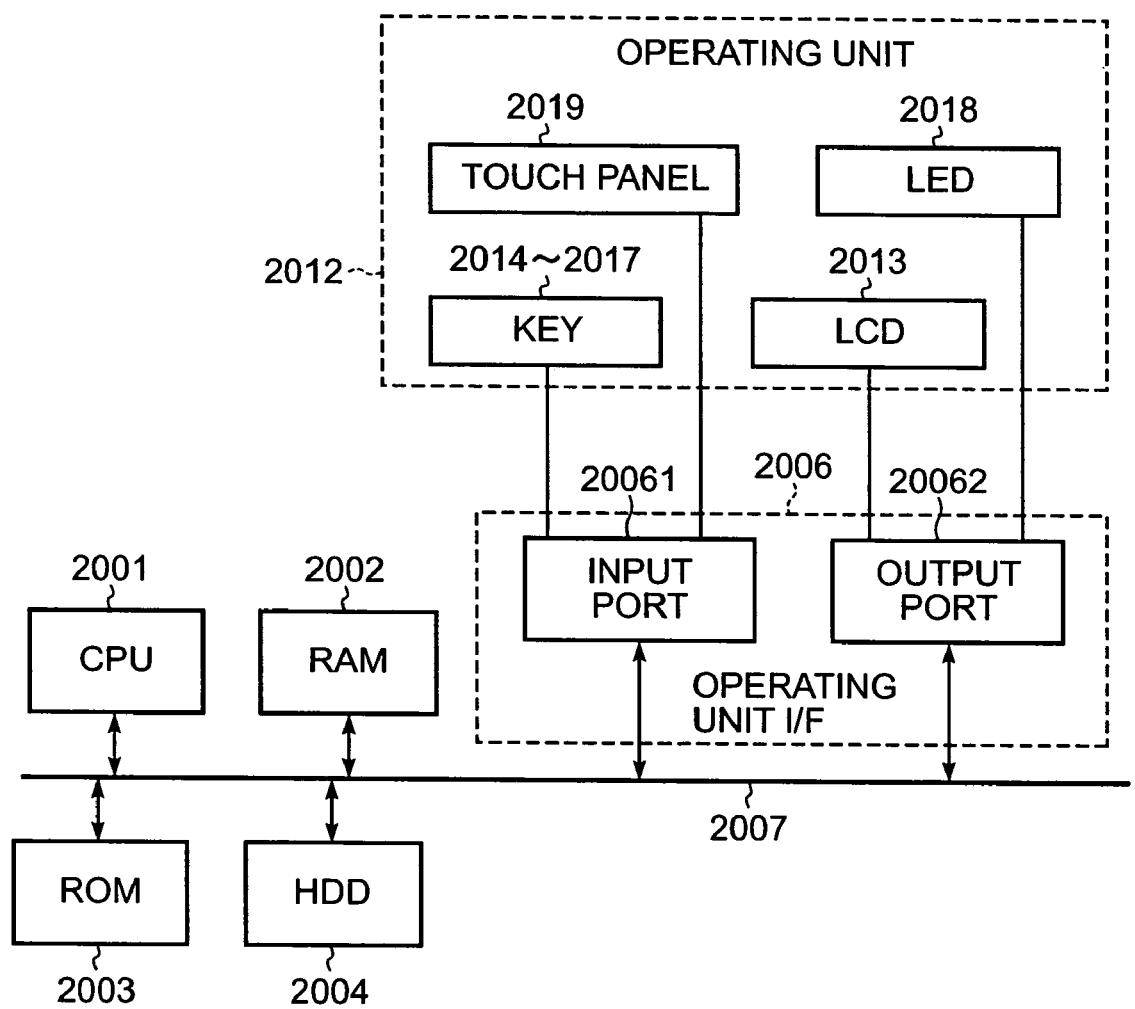
FIG. 5 is a block diagram showing a specific configuration of the operating unit shown in FIG. 2.

FIG. 5 is a block diagram showing a specific configuration of the operating unit 2012 of the MPF 200 shown in FIG. 2. As described above, the operating unit 2012 connects to the system bus 2007 through the operating unit I/F 2006. The operating unit I/F 2006 includes an input port 20061 and an output port 20062, and the CPU 2001 communicates with the operating unit 2012 through the input port 20061 and the output port 20062 of the operating unit I/F 2006. The system bus 2007 connects to the CPU 2001, the RAM 2002, the ROM 2003, and the HDD 2004. The CPU 2001 collectively controls accesses with the respective devices connected to the system bus 2007 based on a control program or the like stored in the ROM 2003 and the HDD 2004. Also, the CPU 2001 reads input information from the scanner 2070 through the device I/F 2020. The input information is processed by the scanner image processing unit 2080 or is rotated by the image rotating unit 2030 depending on a purpose of a user, and then output information is output to the printer 2095 in a form of an image signal. The RAM 2002 functions as a main memory or a work area of the CPU 2001.

<Process in System>

Figure 6:
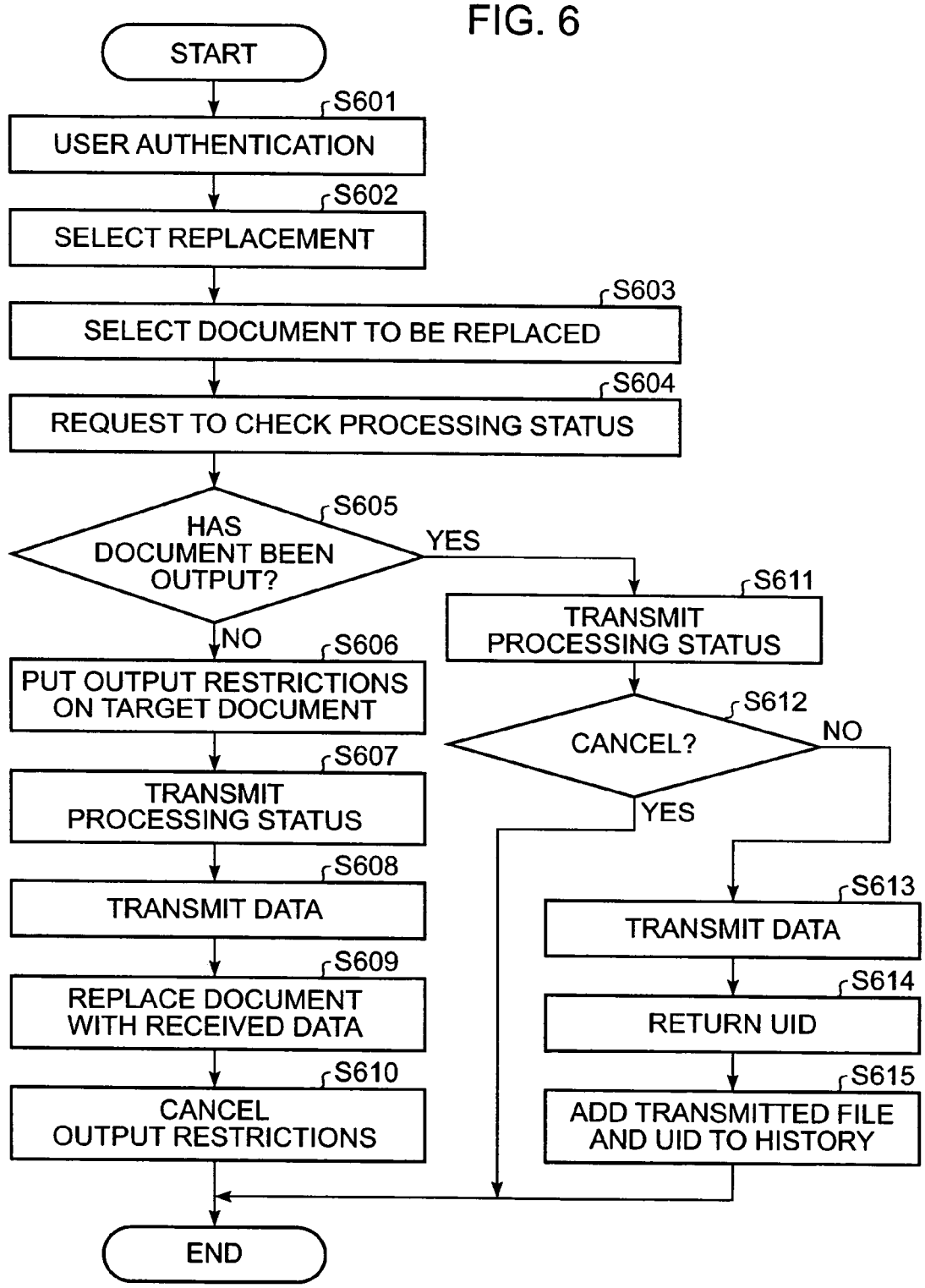
FIG. 6 is a flowchart of a document replacing process performed by the image processing apparatus according to the first embodiment.

FIG. 6 is a flowchart showing an example of a process executed in the image processing system according to this embodiment. FIGS. 7 to 10 show examples of screens used to transmit a replacing document in the image processing system.

Figure 7:
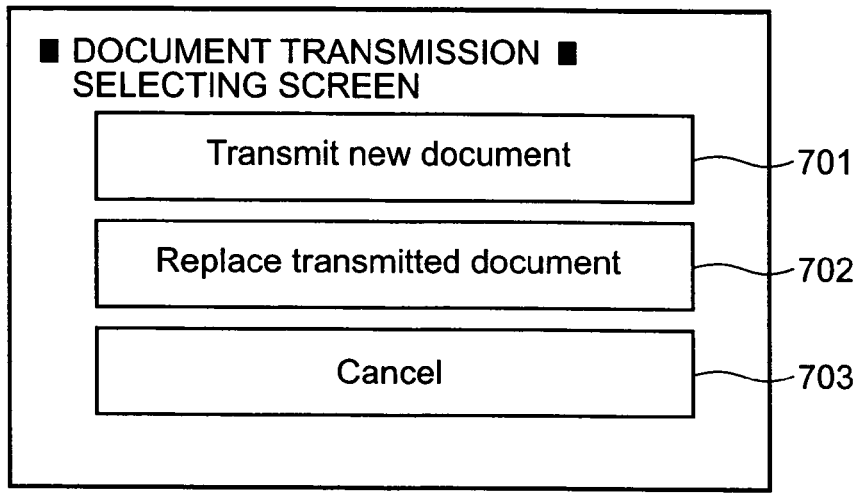
FIG. 7 shows an example of a setting screen used in a document replacing process performed in the image processing apparatus according to the first embodiment.

First, user authentication is executed in the MFP 200 in step S601. The authentication may be executed by inputting a password on the panel or by using the ID key 2016 for personal identification. After completion of the user authentication, a document transmission selecting screen shown in FIG. 7 is displayed in the operating unit 2012. In FIG. 7, a button 701 is used to transmit a new document, a button 702 is used to replace a transmitted document, and a button 703 is used to cancel transmission of a document. Turning back to FIG. 6, in step S602, when the button 702 is selected and a selection of replacing a transmitted document is detected, the process proceeds to step S603.

Figure 8:
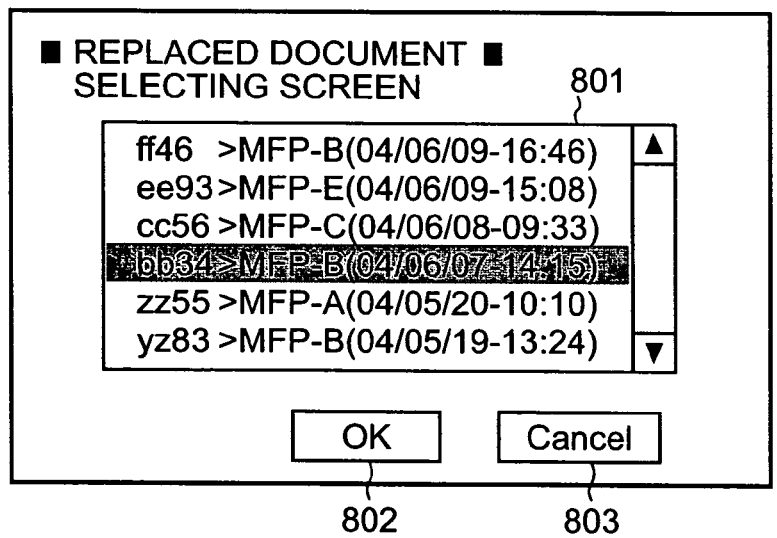
FIG. 8 shows an example of a setting screen used in the document replacing process performed in the image processing apparatus according to the first embodiment.
Figure 9:
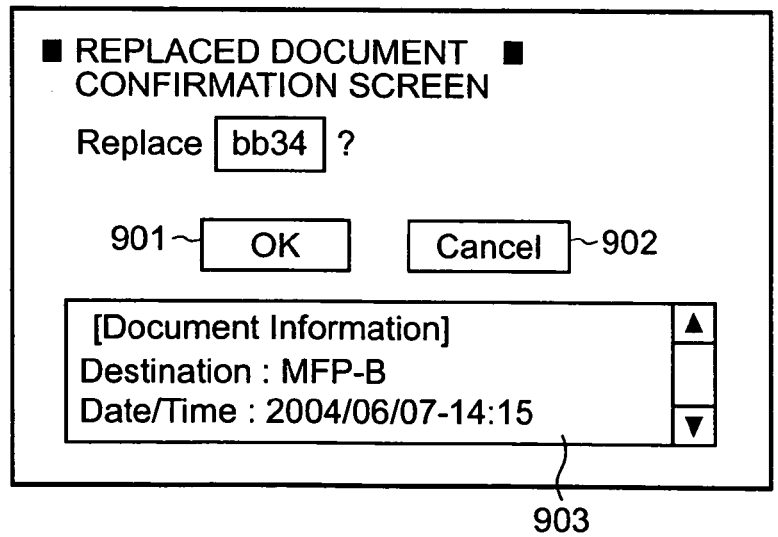
FIG. 9 shows an example of a setting screen used in the document replacing process performed in the image processing apparatus according to the first embodiment.
Figure 10:
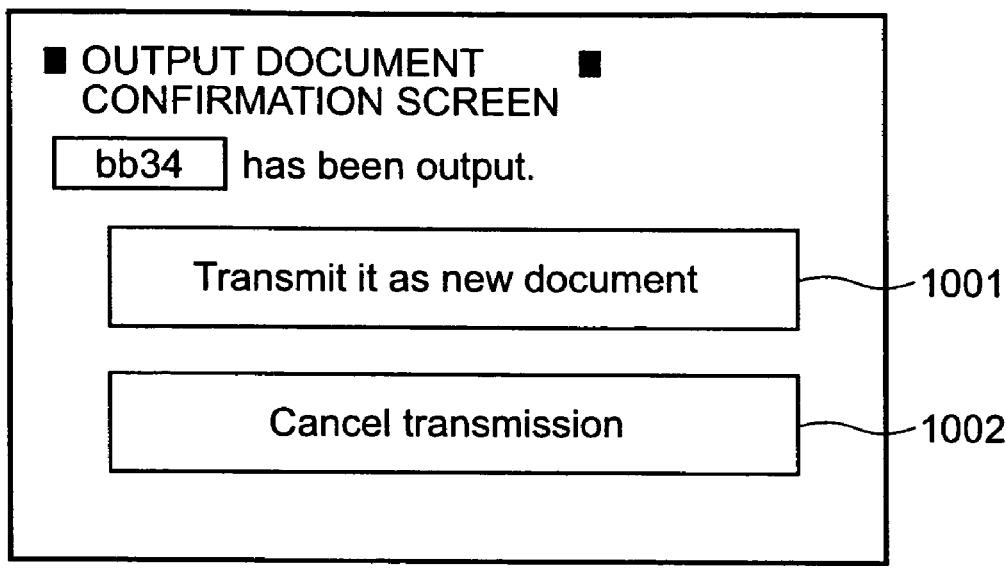
FIG. 10 shows an example of a setting screen used in the document replacing process performed in the image processing apparatus according to the first embodiment.
Figure 16:
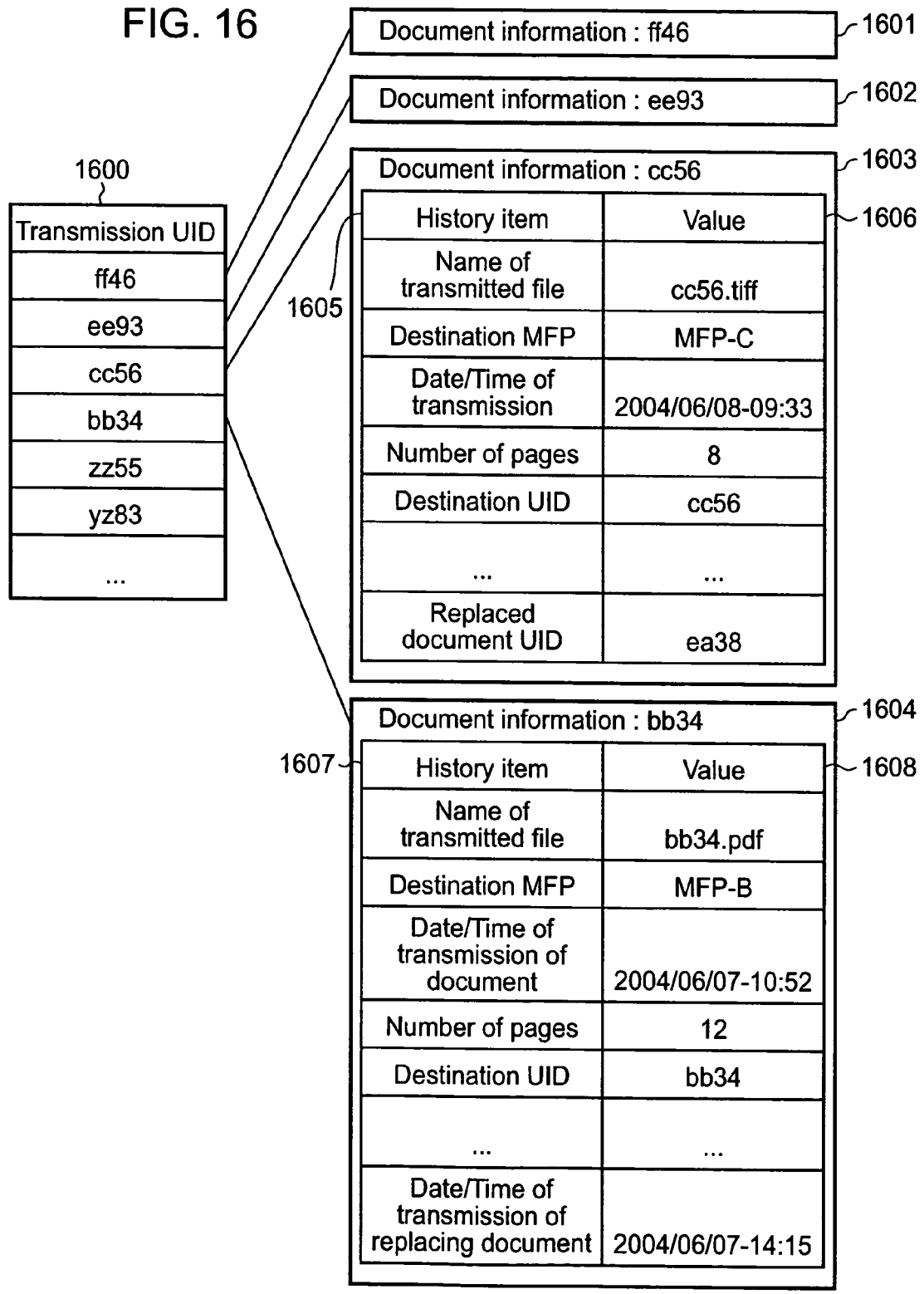
FIG. 16 shows an example of transmission history data stored in the image processing apparatus according to the first embodiment.

In step S603, a replaced document selecting screen shown in FIG. 8 is displayed by referring to transmission history data accumulated in the HDD 2004. FIG. 16 is an example of the transmission history data. A transmission history list 1600 links to document information 1601 to 1604. The document information includes a history item 1605 or 1607 and a value 1606 or 1608. The history item includes a name of a transmitted file, a destination MFP, date/time of transmission, the number of pages, and so on.

Turning back to FIG. 8, a user selects a document to be replaced from a history list 801 of transmitted documents and selects "OK" button 802. If the user wants to cancel the process, the user selects "Cancel" button 803. When the MFP 200 detects that the document to be replaced has been selected and that the "OK" button 802 has been selected, in step S604 of FIG. 6, the MFP 200 transmits a request for checking a processing status of the target document to a selected destination MFP 220 (e.g., in FIG. 8, "MFP-B") together with a corresponding UID. In this embodiment, a request for checking a processing status of the target document shows a request for instruction to replace the target document. Herein, the UID is a unique identifier that is assigned to each transmitted document and that is represented by numbers or the like, e.g., in FIG. 8, the UID is "bb34".

Returning to FIG. 6, in step S605, the destination MFP (i.e., MFP 220) searches for the document corresponding to the UID so as to determine whether the document has been output when the MFP 220 receives the request for checking a process send by MFP 200. If it is determined in step S605 that the target document has not been output, the process flows to step S606, where the MFP 220 puts output restrictions on the target document, and then notifies the MFP 200 that the target document has not been output in step S607. Herein, the output restrictions prohibit printing of data on recording paper by the printer or transfer of data to another apparatus. In this embodiment, notification that the target document has not been output shows notification that the target document enables to be replaced. After receiving the processing status, the MFP 200 displays a replaced document confirmation screen shown in FIG. 9. The user confirms document information 903 and selects "OK" button 901. The MFP 200 detects the selection of the "OK" button 901, and in step S608, transmits the UID of the target document to be replaced and replacing data to the MFP 220, and adds a history of replacement, such as date and time when the replacing document is transmitted. Next, in step S609, the MFP 220 receives the replacing data and overwrites the document corresponding to the UID with the received data, and then cancels the output restrictions in step S610.

If, on the other hand, it is determined in step S605 that the target document to be replaced has been output, the process proceeds to step S611, where the MFP 220 notifies the MFP 200 that the document has been output. In this embodiment, notification that the target document has been output shows notification that the target document does not enable to be replaced. The MFP 200 receives the notification and displays an output document confirmation screen shown in FIG. 10. If, in step S612, selection of the "Cancel transmission" button 1002 is detected, the document transmitting process is completed. If, however, the MFP 200 detects that the "Transmit it as a new document" button 1001 has been selected and that transmission of a new document has been selected, the process proceeds to step S613, where the MFP 200 transmits the image data to the MFP 220 and adds the UID of the target document to be replaced as an UID of a replacement-attempted document to the transmission history. Then, in step S614, MFP 220 assigns a UID to the received document and transmits information about the assigned UID to the MFP 200. Finally, in step S615, the MFP 200 assigns the UID received in step S614 to the corresponding document in the transmission history and stores it.

According to the image processing system having the above-described configuration, if a transmitted document selected from a transmission history in the MFP has not been output, the transmitted document can be replaced with a retransmitted document. Therefore, only a proper document desired by a transmitter can be stored in a receiver apparatus.

Accordingly, resources on the receiver side can be saved and burden of document management on a user can be reduced.

Second Embodiment

A second embodiment is different from the first embodiment in that document attribute information can be changed. The other configurations and processes are the same as those in the first embodiment. Thus, the same parts are denoted by the same reference numerals, the corresponding descriptions are omitted, and only those configurations and processes that are different from those of the first embodiment will be described.

Figure 14:
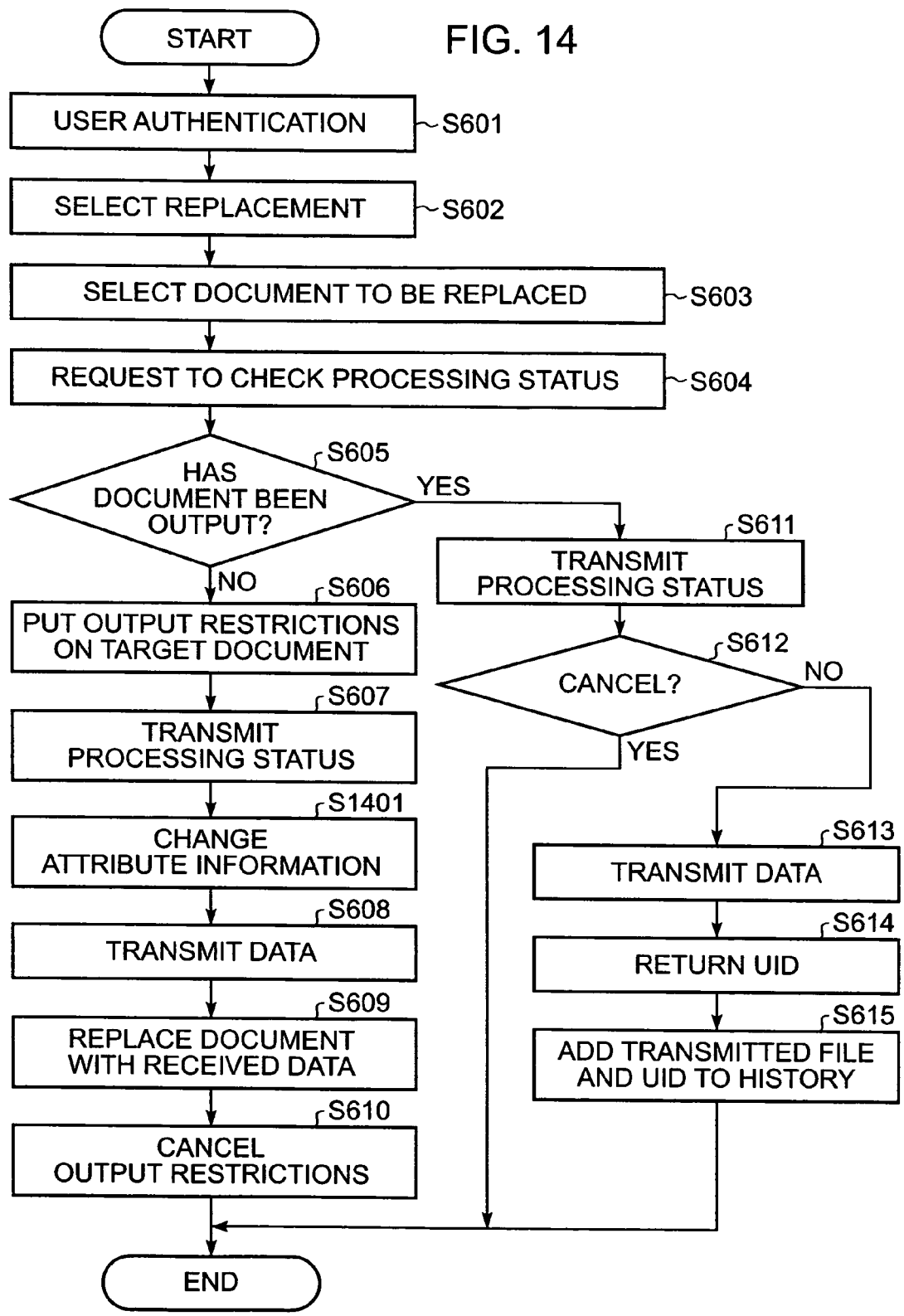
FIG. 14 is a flowchart of a document attribute changing process performed in the image processing apparatus according to the second embodiment.

FIG. 14 is a flowchart showing an example of a process executed in the image processing system according to the present embodiment. In the first embodiment, the MFP 200 receiving a processing status only determines whether the target document to be replaced is correct. This method is advantageous in that a replacing document can be easily transmitted, but is disadvantageous in that document attribute information (e.g., printing mode such as single-sided or double-sided, layout of pages, scaling, etc.) cannot be changed. In the second embodiment, an attribute information changing unit is provided so that document attribute information can be changed when a document is replaced. FIG. 15 shows an example of the document attribute information. An attribute information list 1500 includes an attribute item 1501 and a corresponding value 1502.

Figure 11:
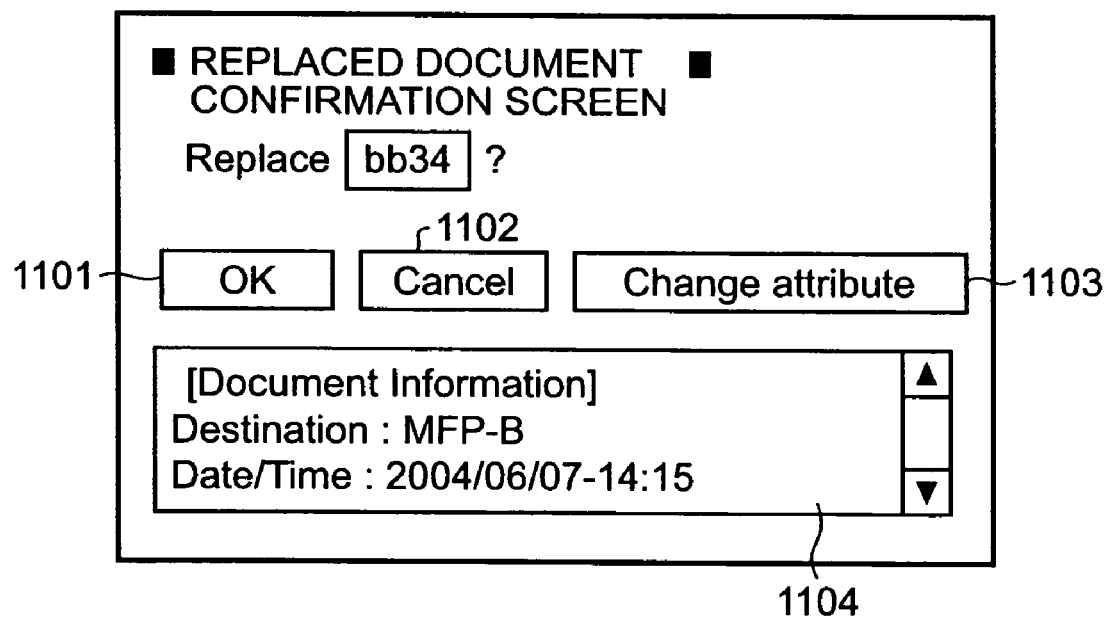
FIG. 11 shows an example of a setting screen used in a document replacing process performed in an image processing apparatus according to a second embodiment.

Turning to FIG. 14, the MFP 200 receives the processing status in step S607 and displays a replaced document confirmation screen shown in FIG. 11 on the LCD display unit 2013 in the operating unit 2012. Herein, the user selects the "OK" button 1101 if the user wants to replace the document without changing document attribute information, or selects the "Cancel" button 1102 when the user wants to cancel replacement. If the user wants to replace the document while changing the document attribute information displayed in section 1104, the user selects "Change attribute" button 1103.

Figure 12:
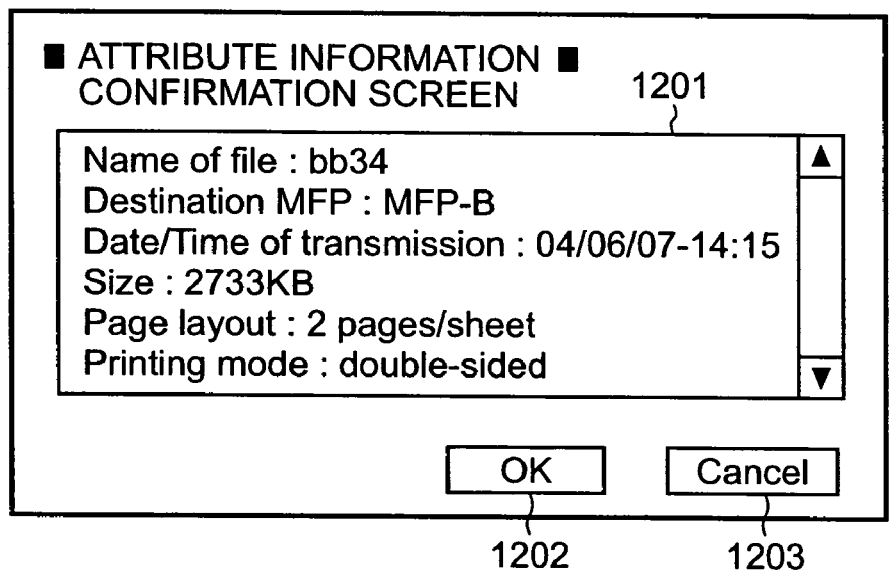
FIG. 12 shows an example of a setting screen used in the document replacing process performed in the image processing apparatus according to the second embodiment.
Figure 13:
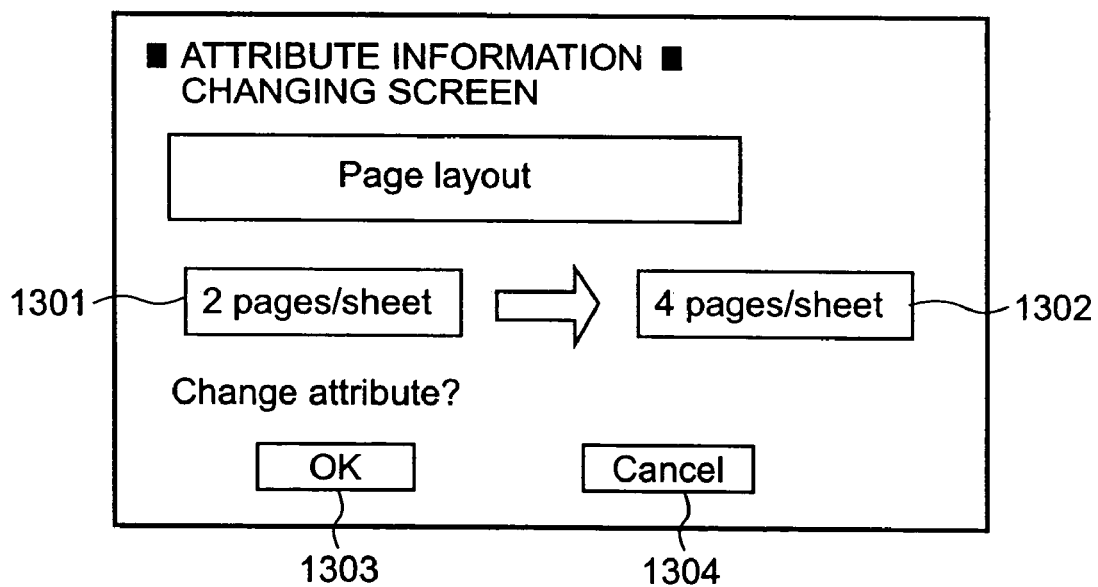
FIG. 13 shows an example of a setting screen used in the document replacing process performed in the image processing apparatus according to the second embodiment.

When the MFP 200 detects selection of the "Change attribute" button 1103, the process proceeds to step S1401, where the MFP 200 reads document attribute information stored as part of the transmission history and displays an attribute information confirmation screen shown in FIG. 12. On this screen, the user selects document attribute information to be changed and selects "OK" button 1202. When the user wants to cancel change of the document attribute information, the user selects "Cancel" button 1203. When the MFP 200 detects selection of the "OK" button 1202, the MFP 200 displays an attribute information changing screen shown in FIG. 13 for the selected document attribute information. A value 1301 before change is displayed on this screen. The user specifies a value 1302 after change and selects the "OK" button 1303. If the user wants to cancel the change, the user selects the "Cancel" button 1304. When the MFP 200 detects selection of the "OK" button 1303, the process proceeds to step S608 of FIG. 14, where the MFP 200 transmits a command of changing the document attribute together with replacing document data to the MFP 220.

The second embodiment allows document data having a different attribute to be easily retransmitted for replacement.

Third Embodiment

A third embodiment is different from the first embodiment in that transmitted image data is selected from a reception history recorded in the MFP on the destination (receiver) side. The other configurations and processes are the same as those in the first embodiment. Thus, the same parts are denoted by the same reference numerals, the corresponding descriptions are omitted, and only those configurations and processes that are different from those of the first embodiment will be described.

Figure 17:
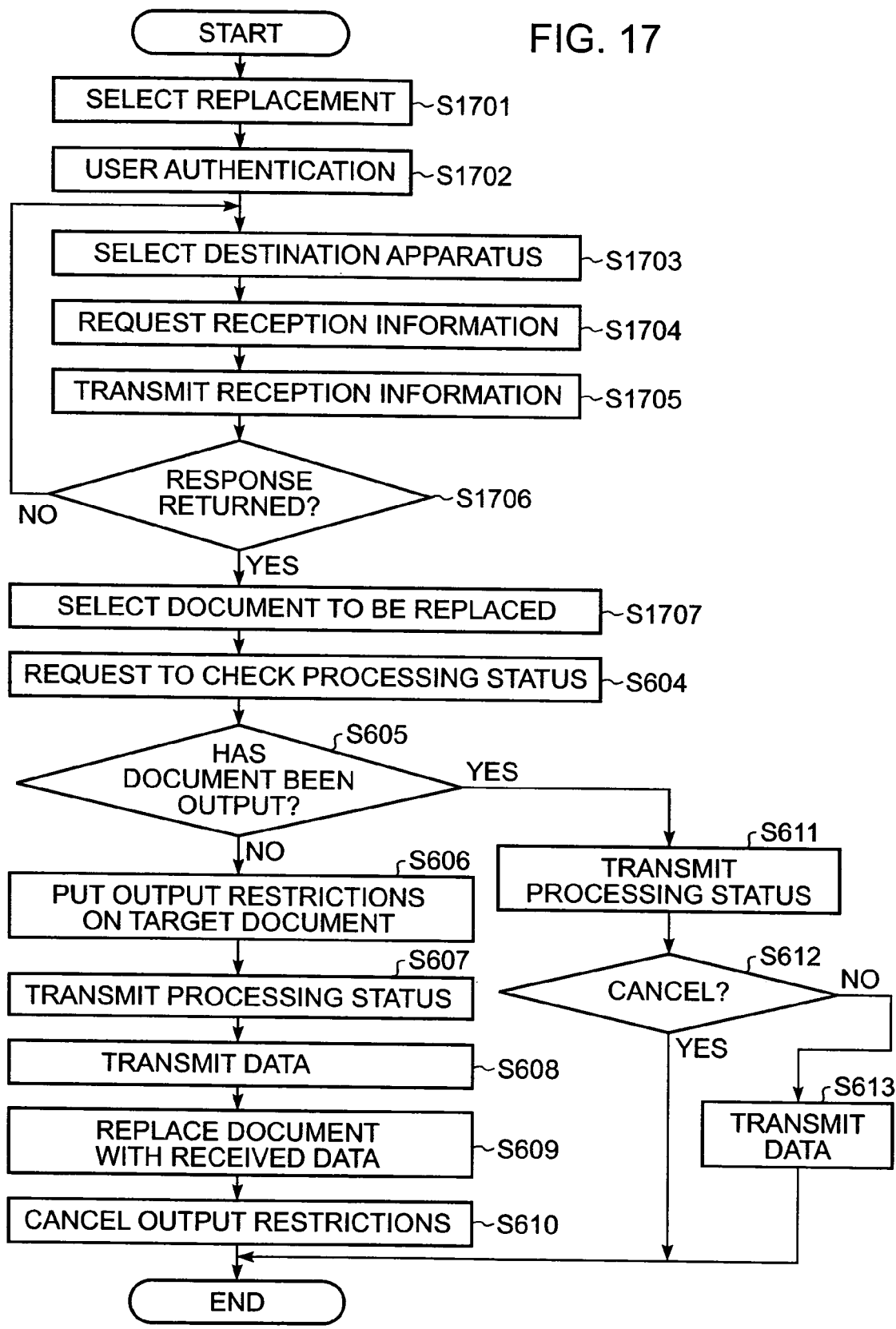
FIG. 17 is a flowchart of a document replacing process performed in an image processing apparatus according to a third embodiment.

FIG. 17 is a flowchart showing an example of a process executed in the image processing system according to this embodiment. In the first embodiment, image data to be replaced is selected from the transmission history recorded in the MFP 200 on the transmitter side. This method allows users to easily transmit replacing image data without being aware of a destination address of the target image data to be replaced. However, only the transmitter of image data can retransmit the image data. Therefore, in this embodiment, reception information recorded in the MFP 220 on the receiver side is used so that image data can be retransmitted from a different transmitter MFP.

Figure 18:
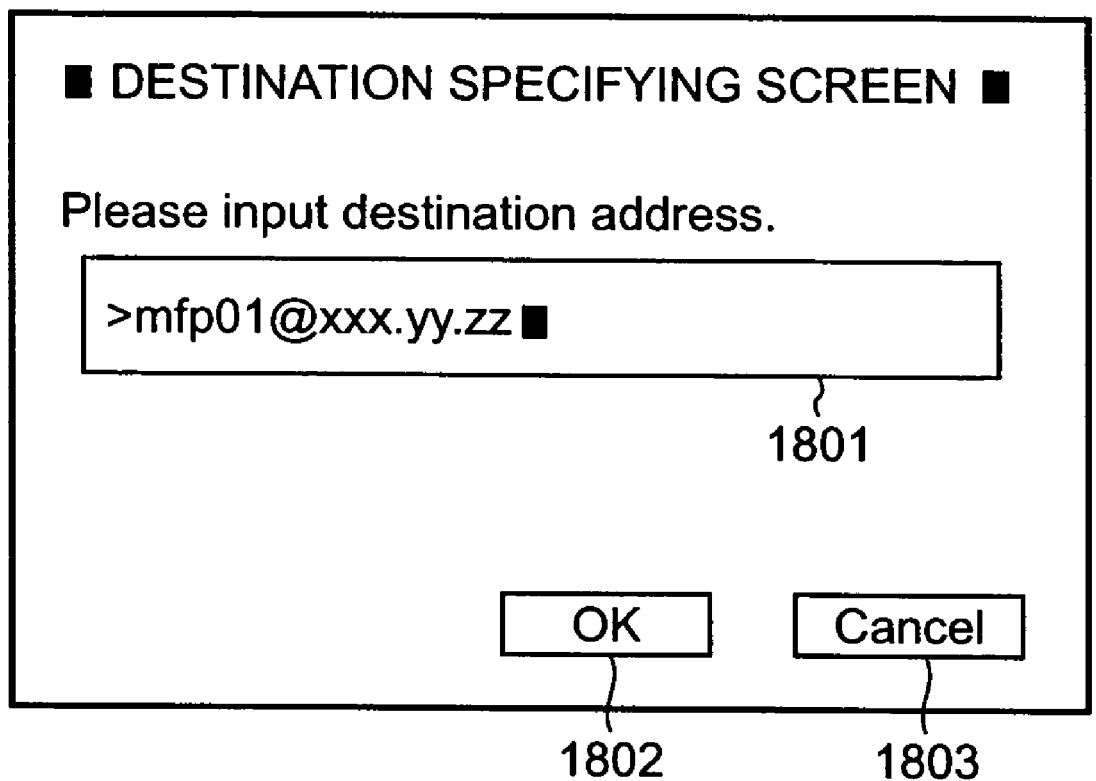
FIG. 18 shows an example of a setting screen used in the document replacing process performed in the image processing apparatus according to the third embodiment.
Figure 19:
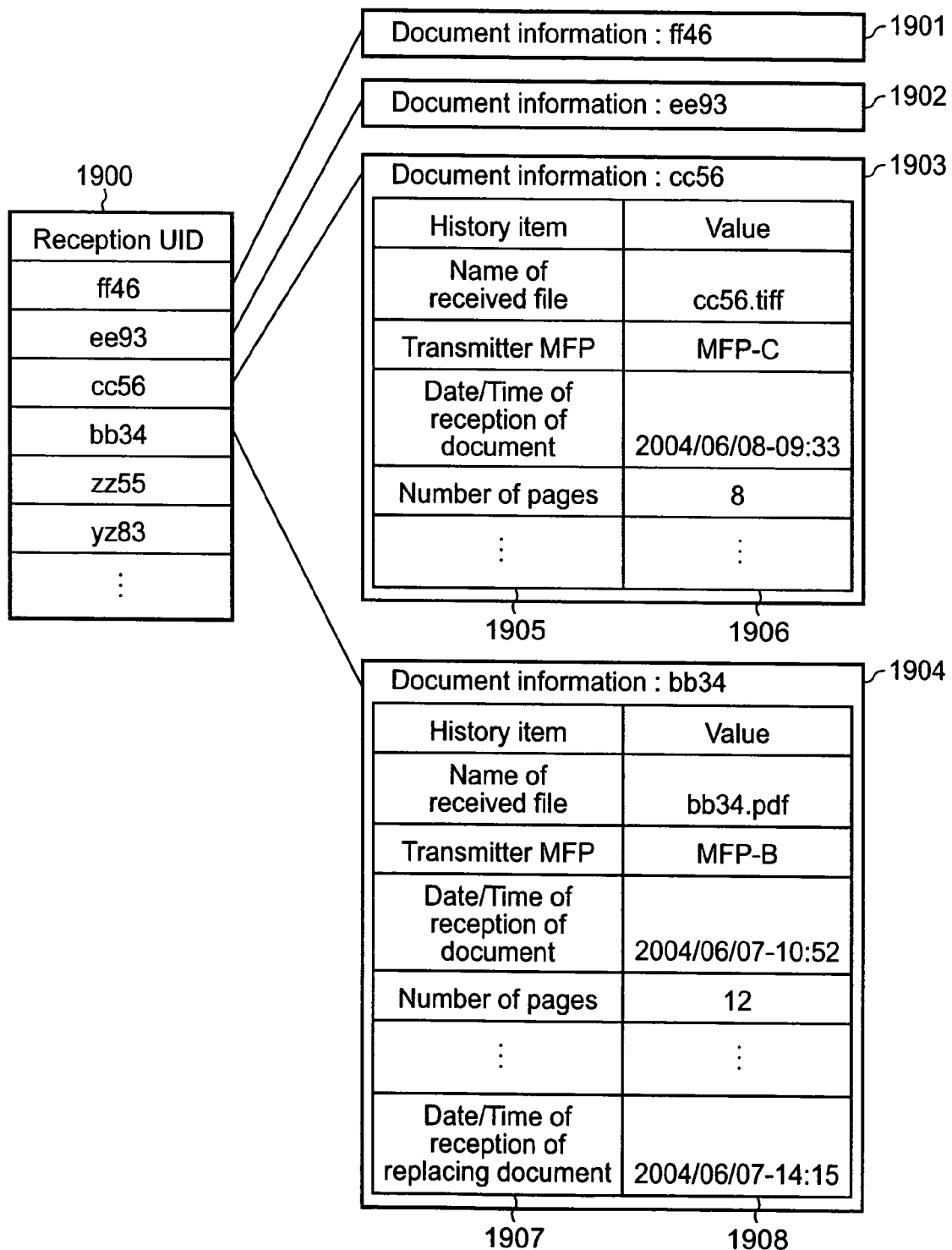
FIG. 19 shows an example of reception history data stored in the image processing apparatus according to the third embodiment.

After replacement is selected in the document transmission selecting screen shown in FIG. 7 in step S1701, the process proceeds to step S1702 where the MFP 200 executes user authentication. After completion of user authentication, a destination specifying screen shown in FIG. 18 is displayed. In FIG. 18, a user inputs a destination address in a destination specifying section 1801 using a soft keyboard or the like. After inputting the address, the user selects "OK" button 1802. When the user wants to cancel the process, the user selects "Cancel" button 1803. When the MFP 200 detects that the destination has been specified and the "OK" button 1802 has been selected in step S1703, the process proceeds to step S1704 where the MFP 200 transmits a request for a reception history together with user authentication information to the specified destination apparatus. FIG. 19 shows an example of reception history data. A reception history list 1900 links to document information 1901 to 1904. The document information includes a history item 1905 or 1907 and a value 1906 or 1908. The history item includes a name of a received file, a transmitter MFP, date/time of reception, the number of pages, and so on.

Returning to FIG. 17, in step S1705, the MFP 220 executes authentication based on the received authentication information and transmits the requested reception history. If, in step S1706, the MFP 200 receives a response from the MFP 220, the process proceeds to step S1707. If, in step S1706, the MFP 200 does not receive a response, the process returns to step S1703, where a destination apparatus is specified again.

In step S1707, the replaced document selecting screen shown in FIG. 8 is displayed based on the obtained reception history data. Then, the user selects a document to be replaced from the history list 801 of transmitted documents.

The subsequent steps are the same as steps S604 to S613 shown in FIG. 6, and thus the corresponding description is omitted.

The third embodiment allows image data to be replaced with another by an MFP different from an MFP that previously transmitted image data.

Other Embodiments

The embodiments of the present invention have been described in detail. The present invention can be applied to a system including a plurality of apparatuses or to a single apparatus.

The present invention can be achieved by supplying a program for realizing the functions of the above-described embodiments to a system or apparatus directly or remotely, so that the system or apparatus reads and executes the supplied program code. Therefore, the program code installed into a computer so as to realize the functions of the present invention in the computer is included in the technical scope of the present invention.

In that case, the format of the program is not specified as long as the program has a program function. For example, object code, a program executed by an interpreter, or script data supplied to an OS may be adopted.

Examples of a recording medium to supply the program include a floppy disk, a hard disk, an optical disk, a magneto-optical disk, a CD-ROM (compact disc read-only memory), a CD-R (compact disc recordable), a CD-RW (compact disc rewritable), a magnetic tape, a nonvolatile memory card, a ROM, and a DVD (digital versatile disc) including a DVD-ROM and a DVD-R.

Also, the program may be supplied by accessing an Internet website by using a browser in a client computer and by downloading the computer program of the present invention or a compressed file including an automatic install function from the website to a recording medium, such as a hard disk. Alternatively, the program code constituting the program of the present invention may be divided into a plurality of files and the respective files may be downloaded from different websites. Therefore, a WWW (World Wide Web) server allowing a plurality of users to download the program files for realizing the functions of the present invention in the computer is included in the scope of the present invention.

Also, the program of the present invention may be encrypted and stored in storage media such as CD-ROMs, and the CD-ROMs may be distributed to users. In this case, only users that cleared a predetermined condition can download key information for decrypting the program from a website on the Internet. The user executes the encrypted program by using the key information and installs the program in a computer.

The functions of the above-described embodiments are realized when a computer reads and executes the program. Alternatively, the functions of the above-described embodiments may be realized when an OS operating in the computer executes part or whole of actual processing based on the instructions of the program.

Also, the functions of the above-described embodiments may be realized when the program read from a recording medium is written in a memory included in a function expanding board inserted into a computer or a memory included in a function expanding unit connected to a computer and then a CPU included in the function expanding board or the function expanding unit executes part or whole of actual processing based on the instructions of the program.

According to the present invention, image data can be effectively retransmitted, so that resources on a receiver side can be saved and burden of document management on a user can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present application claims priority from Japanese Patent Applications No. 2004-262955 filed Sep. 9, 2004 and No. 2005-156196 filed May 27, 2005, which are incorporated hereby incorporated by reference herein in their entirety.

What is claimed is:

1. An image processing system including at least first and second image processing apparatuses, the image processing system comprising:

the first image processing apparatus on a transmitter side, comprising:
a history storing unit adapted to store a transmission history of image data;
an input unit adapted to input an instruction of specifying image data in the transmission history stored in the history storing unit and transmitting image data with which the specified image data is replaced;
a determination requesting unit adapted to request determination of whether the second image processing apparatus on a receiver side has output the image data specified by the input unit, to the second image processing apparatus; and
a transmitting unit adapted to transmit, to the second image processing apparatus, the image data with which the image data specified by the input unit is replaced, if it is determined that the second image processing apparatus has not output the image data specified by the input unit, and the second image processing apparatus on the receiver side, comprising:
a responding unit adapted to determine whether the second image processing apparatus has output the image data specified by the input unit and respond to the request from the first image processing apparatus; and
a replacing unit adapted to replace the image data specified by the input unit with the image data transmitted from the first image processing apparatus by the transmitting unit.

2. The image processing system according to claim 1, wherein, output of the specified image data is restrained until the specified image data is replaced with the image data retransmitted from the first image processing apparatus by the replacing unit.

3. The image processing system according to claim 1, wherein the second image processing apparatus further comprises:
a storing unit adapted to store received image data while assigning an identifier thereto; and
a notifying unit adapted to notify the first image processing apparatus of the identifier, and
wherein the history storing unit stores the identifier together with the transmission history when receiving the identifier from the second image processing apparatus after transmitting the image data.

4. The image processing system according to claim 1, wherein the transmission history stored in the history storing unit includes attribute information of transmitted image data, and the retransmitting unit is capable of retransmitting the image data to be replaced with the transmitted image data after changing the attribute thereof.

5. The image processing system according to claim 4, wherein the attribute information includes information for distinguishing at least any of double-sided printing or one-sided printing, two-page printing or four-page printing, and color printing or monochrome printing.

6. An image processing apparatus capable of transmitting image data to another image processing apparatus, comprising:
a history storing unit adapted to store a transmission history of image data;
an input unit adapted to input an instruction of specifying image data in the transmission history stored in the history storing unit and transmitting image data with which the specified image data is replaced;
a determination requesting unit adapted to request determination of whether the another image processing apparatus has output the image data specified by the input unit to the another image processing apparatus; and a transmitting unit adapted to transmit, to the another image processing apparatus, the image data with which the image data specified by the input unit is replaced, based on the instruction if it is determined that the another image processing apparatus has not output the image data specified by the input unit.

7. An image processing apparatus capable of receiving image data from another image processing apparatus, comprising:

a receiving unit adapted to receive image data from the another image processing apparatus;

an output unit adapted to output the image data received by the receiving unit;

a determination request receiving unit adapted to receive a request for determining whether the output unit has output the previously-received image data, from the another image processing apparatus;

a responding unit adapted to determine whether the output unit has output the previously-received image data and respond to the request received by the determination request receiving unit; and a replacing unit adapted to replace the previously-received image data which has not been output by the output unit with image data transmitted from the another image processing apparatus after the responding unit responds to the request received by the determination request receiving unit.

8. A control method for a first image processing apparatus capable of transmitting image data to a second image processing apparatus, the control method comprising:

a history storing step of storing a transmission history of image data;

an input step of inputting an instruction of specifying image data in the transmission history stored in the history storing step and transmitting image data with which the specified image data is replaced;

a determination requesting step of requesting determination of whether the second image processing apparatus has output the image data specified in the input step, to the second image processing apparatus; and a transmitting step of transmitting, to the second image processing apparatus, the image data with which the image data specified in the input step is replaced if it is determined that the second image processing apparatus has not output the image data specified in the input step.

9. A computer-readable storage medium storing a computer-executable process, the computer-executable process causing a computer to implement the method of claim 8.

10. A control method for a first image processing apparatus capable of receiving image data from a second image processing apparatus, the control method comprising:

a receiving step of receiving image data from the second image processing apparatus;

a determination request receiving step of receiving a request for determining whether the first image processing apparatus has output previously-received image data, from the second image processing apparatus;

a responding step of determining whether the first image processing apparatus has output the previously-received image data and responding to the request received in the determination request receiving step; and a replacing step of replacing the previously-received image data with image data transmitted from the second image processing apparatus after the responding step responds to the request received in the determination request receiving step.

11. A computer-readable storage medium storing a computer-executable process, the computer-executable process causing a computer to implement the method of claim 10.

12. An image processing system including at least first and second image processing apparatuses, the image processing system comprising:

the first image processing apparatus on a transmitter side, comprising:

a history requesting unit adapted to request a reception history of image data, to the second image processing apparatus on a receiver side;

an input unit adapted to input an instruction of specifying image data in the reception history transmitted from the second image processing apparatus and transmitting image data with which the specified image data is replaced;

a determination requesting unit adapted to request determination of whether the second image processing apparatus has output the image data specified by the input unit, to the second image processing apparatus; and a transmitting unit adapted to transmit, to the second image processing apparatus, the image data with which the image data specified by the input unit is replaced if it is determined that the second image processing apparatus has not output the image data specified by the input unit, and the second image processing apparatus on the receiver side, comprising:

a history storing unit adapted to store the reception history of image data;

a history transmitting unit adapted to transmit the reception history stored in the history storing unit to the first image processing apparatus in response to the request from the first image processing apparatus by the history requesting unit;

a responding unit adapted to determine whether the second image processing apparatus has output the image data specified by the input unit and respond to the request from the first image processing apparatus by the determination requesting unit; and a replacing unit adapted to replace the image data specified by the input unit with the image data transmitted from the first image processing apparatus by the transmitting unit.

13. The image processing system according to claim 12, wherein output of previously-received image data is restrained until the previously-received image data is replaced with the image data retransmitted from the first image processing apparatus by the replacing unit.

14. An image processing apparatus capable of transmitting image data to another image processing apparatus, comprising:

a history requesting unit adapted to request a reception history of image data, to the another image processing apparatus;

an input unit adapted to input an instruction of specifying image data in the reception history transmitted from the another image processing apparatus and transmitting image data with which the specified image data is replaced;

a determination requesting unit adapted to request determination of whether the another image processing apparatus has output the image data specified by the input unit to the another image processing apparatus; and a transmitting unit adapted to transmit, to the another image processing apparatus, the image data with which the image data specified by the input unit is replaced if it is determined that the another image processing apparatus has not output the image data specified by the input unit.

15. An image processing apparatus capable of receiving image data from another image processing apparatus, comprising:

a receiving unit adapted to receive image data from the another image processing apparatus;

a history storing unit adapted to store a reception history of the image data;

an output unit adapted to output the image data received by the receiving unit;

a history transmitting unit adapted to transmit the reception history stored in the history storing unit to the another image processing apparatus in response to a request from the another image processing apparatus;

a determination request receiving unit adapted to receive a request for determining whether the output unit has output previously-received image data, from the another image processing apparatus;

a responding unit adapted to determine whether the output unit has output the previously received image data and respond to the request received by the determination request receiving unit; and a replacing unit adapted to replace the previously-received image data with image data transmitted from the another image processing apparatus after the responding unit responds to the request received by the determination request receiving unit.

16. A control method for a first image processing apparatus capable of transmitting image data to a second image processing apparatus, the control method comprising:

a history requesting step of requesting a reception history of image data to the second image processing apparatus;

an input step of inputting an instruction of specifying image data in the reception history transmitted from the second image processing apparatus and transmitting image data with which the specified image data is replaced;

a determination requesting step of requesting determination of whether the second image processing apparatus has output the image data specified by the input step to the second image processing apparatus; and a transmitting step of transmitting, to the second image processing apparatus, the image data with which the image data specified in the inputting step is replaced if it is determined that the second image data processing apparatus has not output the image data specified in the imputing step.

17. A computer-readable storage medium storing a computer-executable process, the computer-executable process causing a computer to implement the method of claim 16.

18. A control method for a first image processing apparatus capable of receiving image data from a second image processing apparatus, the control method comprising:

a receiving step of receiving image data from the second image processing apparatus;

a history storing step of storing a reception history of the image data;

an output step of outputting the image data received in the receiving step;

a history transmitting step of transmitting the reception history stored in the history storing step to the second image processing apparatus in response to a request from the second image processing apparatus;

a determination request receiving step of receiving a request for determining whether the first image processing apparatus has output the previously-received image data, from the second image processing apparatus;

a responding step of determining whether the first image processing apparatus has output the previously-received image data and responding to the request received in the determination request receiving step; and a replacing step of replacing the previously received image data with image data transmitted from the second image processing apparatus after the responding step responds to the request received in the determination request receiving step.

19. A computer-readable storage medium storing a computer-executable process, the computer-executable process causing a computer to implement the method of claim 18.

20. An image processing system including an image processing apparatus and a storage apparatus for storing image data, the image processing system comprising:

the image processing apparatus, comprising:

a history storing unit adapted to store a transmission history of image data;

a first transmitting unit adapted to transmit, to the storage apparatus, image data with which image data specified from the transmission history stored in the history storing unit is replaced, if an instruction of transmitting the image data with which the specified image data is replaced is input; and a second transmitting unit adapted to transmit, to the storage apparatus, image data as new image data, if an instruction of transmitting the image data as new image data is input, and the storage apparatus comprising:

a replace unit adapted to replace the specified image data with the image data transmitted by the first transmitting unit; and a storing unit adapted to store the image data transmitted by the second transmitting unit as new image data.

21. An image processing apparatus capable of transmitting image data to a storage apparatus for storing image data, comprising:

a history storing unit adapted to store a transmission history of image data;

a first transmitting unit adapted to transmit, to the storage apparatus, image data with which image data specified from the transmission history stored in the history storing unit is replaced, if an instruction of transmitting the image data with which the specified image data is replaced is input; and a second transmitting unit adapted to transmit, to the storage apparatus, image data as new image data, if an instruction of transmitting the image data as new image data is input.

22. An image processing system including an image processing apparatus and a storage apparatus for storing image data, the image processing system comprising:

the image processing apparatus, comprising:

a history requesting unit adapted to request a reception history of image data to the storage apparatus;

a first transmitting unit adapted to transmit, to the storage apparatus, image data with which image data specified from the reception history transmitted from the storage apparatus is replaced, if an instruction of transmitting the image data with which the specified image data is replaced is input; and a second transmitting unit adapted to transmit, to the storage apparatus, image data as new image data, if an instruction of transmitting the image data as new image data is input, and the storage apparatus comprising:

a replace unit adapted to replace the specified image data with the image data transmitted by the first transmitting unit; and a storing unit adapted to store the image data transmitted by the second transmitting unit as new image data.

23. An image processing apparatus capable of transmitting image data to a storage apparatus for storing image data, comprising:

a history requesting unit adapted to request a reception history of image data to the storage apparatus;

a first transmitting unit adapted to transmit, to the storage apparatus, image data with which image data specified from the reception history transmitted from the storage apparatus is replaced, if an instruction of transmitting the image data with which the specified image data is replaced is input; and a second transmitting unit adapted to transmit, to the storage apparatus, image data as new image data, if an instruction of transmitting the image data as new image data is input.

* * * * *